(12) United States Patent
Cannon et al.

(10) Patent No.: US 10,236,716 B2
(45) Date of Patent: Mar. 19, 2019

(54) LAMP WITH BATTERY BACKUP CAPABILITY

(71) Applicant: ENERGY FOCUS, INC., Solon, OH (US)

(72) Inventors: Todd Arthur Cannon, Mantorville, MN (US); Dmitri Dmitrievich Kourennyi, Shaker Heights, OH (US); Jeremiah A. Heilman, Rochester, MN (US)

(73) Assignee: ENERGY FOCUS, INC., Solon, OH (US)

( * ) Notice: Subject to any disclaimer, the term of this patent is extended or adjusted under 35 U.S.C. 154(b) by 0 days.

(21) Appl. No.: 15/493,216

(22) Filed: Apr. 21, 2017

(65) Prior Publication Data

US 2017/0310157 A1   Oct. 26, 2017

Related U.S. Application Data (60) Provisional application No. 62/326,261, filed on Apr. 22, 2016.

(51) Int. Cl.
*H02J 9/06* (2006.01)
*F21K 9/275* (2016.01)
(Continued)

(52) U.S. Cl.
CPC ............... *H02J 9/061* (2013.01); *F21K 9/27* (2016.08); *F21K 9/275* (2016.08); *F21K 9/278* (2016.08);
(Continued)

(58) Field of Classification Search
CPC .......... F21V 29/00; F21V 99/00; F21V 23/00; F21V 23/004; F21V 29/22; H05B 37/02; H05B 37/0272; F21K 9/00; F21K 2101/02
(Continued)

(56) References Cited

U.S. PATENT DOCUMENTS

| 5,625,258 A | 4/1997 | Preis |
| 9,497,821 B2 | 11/2016 | Liu |

(Continued)

FOREIGN PATENT DOCUMENTS

| CN | 106163029 A | 11/2016 |
| CN | 106714395 A | 5/2017 |

(Continued)

OTHER PUBLICATIONS http://www.cfhtel.com; "Quotation of Wall Switch Control T8 LED Emergency Tube", Shenzhen Chengfenghao Electronics Co., LTD., Jul. 13, 2016, 3 pages.

(Continued)

*Primary Examiner* — Wei Chan
(74) *Attorney, Agent, or Firm* — Rankin, Hill & Clark LLP (57) ABSTRACT

A lamp includes a first pair of primary electrical contacts configured to be electrically connected to a AC mains, a second pair of primary electrical contacts configured to be electrically connected to a non-switched emergency mains, and a battery charge controller in electrical communication with the second pair of electrical contacts. The lamp also includes a battery pack in electrical communication with the battery charge controller, an AC mains driver electrically connected to the first pair of primary electrical contacts, an emergency driver electrically connected to the battery pack, and an LED array in electrical communication with the AC mains driver and the emergency driver.

17 Claims, 5 Drawing Sheets

(51) Int. Cl.
*F21K 9/278* (2016.01)
*F21V 23/06* (2006.01)
*H02J 7/00* (2006.01)
*H02J 7/02* (2016.01)
*F21S 9/02* (2006.01)
*F21K 9/27* (2016.01)
*F21Y 103/10* (2016.01)
*F21Y 115/10* (2016.01)
*H02J 9/00* (2006.01)
*H05B 33/08* (2006.01)

(52) U.S. Cl.
CPC .............. *F21S 9/022* (2013.01); *F21V 23/06* (2013.01); *H02J 7/0013* (2013.01); *H02J 7/02* (2013.01); *F21Y 2103/10* (2016.08); *F21Y 2115/10* (2016.08); *H02J 9/00* (2013.01); *H05B 33/08* (2013.01)

(58) Field of Classification Search
USPC .................................. 362/217.01–17; 315/34
See application file for complete search history.

(56) References Cited

U.S. PATENT DOCUMENTS

| | | | |
|---|---|---|---|
| 9,521,718 B2 | 12/2016 | Xiong et al. | |
| 9,526,145 B2 | 12/2016 | Xiong et al. | |
| 9,585,221 B1 | 2/2017 | Chen et al. | |
| 9,587,817 B2 | 3/2017 | Liu et al. | |
| 2008/0151535 A1* | 6/2008 | de Castris | A47F 3/001 |
| | | | 362/220 |
| 2010/0117558 A1* | 5/2010 | Lee | H05B 33/0803 |
| | | | 315/294 |
| 2011/0149563 A1 | 6/2011 | Hsia et al. | |
| 2012/0176714 A1 | 7/2012 | Cheng | |
| 2012/0299494 A1 | 11/2012 | Hartikka | |
| 2012/0307524 A1 | 12/2012 | Schapiro et al. | |
| 2013/0113393 A1 | 5/2013 | Fujita et al. | |
| 2014/0015345 A1 | 1/2014 | Ivey et al. | |
| 2015/0062889 A1* | 3/2015 | Kika | F21S 8/031 |
| | | | 362/223 |
| 2015/0163867 A1* | 6/2015 | Recker | H02J 9/02 |
| | | | 315/250 |
| 2016/0091149 A1 | 3/2016 | Glachman | |
| 2016/0348851 A1* | 12/2016 | Amrine, Jr. | F21K 9/175 |
| 2017/0268731 A1 | 9/2017 | Vashi et al. | |

FOREIGN PATENT DOCUMENTS

| | | |
|---|---|---|
| DE | 4342590 A1 | 6/1995 |
| GB | 2488845 | 9/2012 |
| GB | 2489513 | 10/2012 |
| WO | 2010/127366 A2 | 11/2010 |
| WO | 2016/154845 A1 | 10/2016 |

OTHER PUBLICATIONS http://www.cfhtel.com; Quotation of T8 LED Emergency Tube with Remote Control:, Shenzhen Chengfenghao Electronics Co., LTD., Jul. 13, 2016, 3 pages.
http://www.itsuwaled.com/pd.jsp?id=6.com; Product Detail of "Emergency + Sensor T8 LED Tube"; Model YSH-T8XX-Y01-XX; Shenzhen Itsuwa Light Co., Ltd., Shenzhen, China, 12 pages.
http://www.comledbulb.com/sale-4194460-battery-backup-t8-emergency-led-tube.html; "Battery Backup T8 Emergency LED Tube", Brand Name: Romanso; Model No. RMS-18-E3-18W-4F; Copyright 2015-2016 http://www.cornledbulb.com, 4 pages.
International Search Report/Written Opinion dated Jul. 11, 2017, 15 pages.
International Search Report and Written Opinion, PCT/US2017/033075, dated Mar. 19, 2018, 16 pages.
http://www.comledbulb.com/sale-4194460-battery-backup-t8-emergency-led-tube.html; "Battery Backup T8 Emergency LED Tube" ; Brand name: Romanso, Copyright 2015-2016 comledbulb.com; 4 pages.
PCT Notification of Transmittal of the International Search Report and the Written Opinion of the International Searching Authority, or the Declaration; International Search Report; Written Opinion of the International Search Authority, dated May 23, 2017, 15 pages.
Office Action dated Jun. 28, 2018 from U.S. Appl. No. 15/458,497, filed Mar. 14, 2017, 20 pages.

\* cited by examiner

LAMP WITH BATTERY BACKUP CAPABILITY

BACKGROUND

Traditional electrical power (hereinafter AC mains) supplied by the utility company is occasionally unavailable because of power outages. Power outages may be due to local disruptions because of building emergencies or more widespread outages due to grid overloading. Thus, it is desirable to have backup lighting. This backup lighting can be used to provide building occupants sufficient light to allow egress from the building until the AC mains is restored.

A variety of techniques can be used to supply backup lighting. However, the known techniques are either overly complicated, thereby increasing equipment and installation costs and/or do not meet building code requirements. Further, the known techniques may not be aesthetically pleasing or elegant. Thus, there is room for improvement.

SUMMARY

In view of the foregoing, a novel lamp with battery backup capability is provided. The lamp includes a first pair of primary electrical contacts configured to be electrically connected to a AC mains, a second pair of primary electrical contacts configured to be electrically connected to a non-switched emergency mains, and a battery charge controller in electrical communication with the second pair of electrical contacts. The lamp also includes a battery pack in electrical communication with the battery charge controller, an AC mains driver electrically connected to the first pair of primary electrical contacts, an emergency driver electrically connected to the battery pack, and an LED array in electrical communication with the AC mains driver and the emergency driver.

A method of operating a TLED lamp includes the step of positioning the TLED lamp such that a first base of the TLED lamp is electrically and mechanically connected to a first lampholder and a second base of the TLED lamp is electrically and mechanically connected to a second lampholder. The first lampholder is electrically connected to a switched electrical mains and the second lampholder is electrically connected to a non-switched electrical mains. The method also includes the step of sensing a presence and an absence of electrical power supplied to the second base, charging a battery pack of the TLED lamp with the electrical power supplied to the second base, illuminating an LED array of the TLED lamp with electrical power supplied to the first base when the presence of the electrical power at the second base is sensed, and illuminating the LED array of the TLED lamp with electrical power from the battery when the absence of the electrical power at the second base is sensed.

According to an embodiment, the TLED lamp includes a housing, an LED array disposed within the housing, a first base disposed at a first end of the housing, and a second base disposed at a second end of the housing. The first end and the second end are at opposite ends of the housing. The first base and the second base are electrically isolated from one another. The TLED lamp also includes an AC mains driver disposed within the housing and in electrical communication with the first base.

The AC mains driver receives electrical power from an AC mains. The TLED lamp also includes a battery charge controller disposed within the housing and in electrical communication with the second base. The battery charge controller receives electrical power from an emergency mains. The TLED lamp also includes a battery pack disposed within the housing and in electrical communication with the battery charge controller. The battery pack is charged by the battery charge controller.

The TLED lamp further includes an emergency driver disposed within the housing and in electrical communication with the battery pack, and a microcontroller disposed within the housing that senses a presence and an absence of power from the second base. The microcontroller instructs the AC mains driver to supply power to the LED array when power is present at the second base and supply power from the battery pack to the LED array when power is absent from the second base.

DETAILED DESCRIPTION

With reference to FIGS. 1-4B, a lamp 10, 10' with battery backup capability is depicted. For reference, like elements will use like reference numbers throughout the disclosure. Where there are pertinent differences, the elements will be identified with an apostrophe appended to the reference number. The lamp 10, 10' is designed to operate in a normal mode (i.e., power being supplied from an emergency mains 12) and, alternatively, in an emergency mode (i.e., power not being supplied from the emergency mains 12). For reference, the emergency mains 12 would not be a switched supply.

Figure 4A:
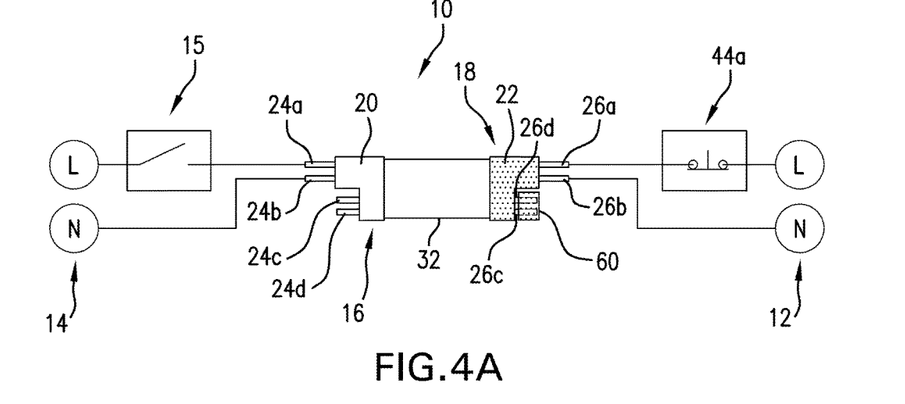
FIGS. 4A-4B are schematic views of the lamp in an installed state.
Figure 4B:
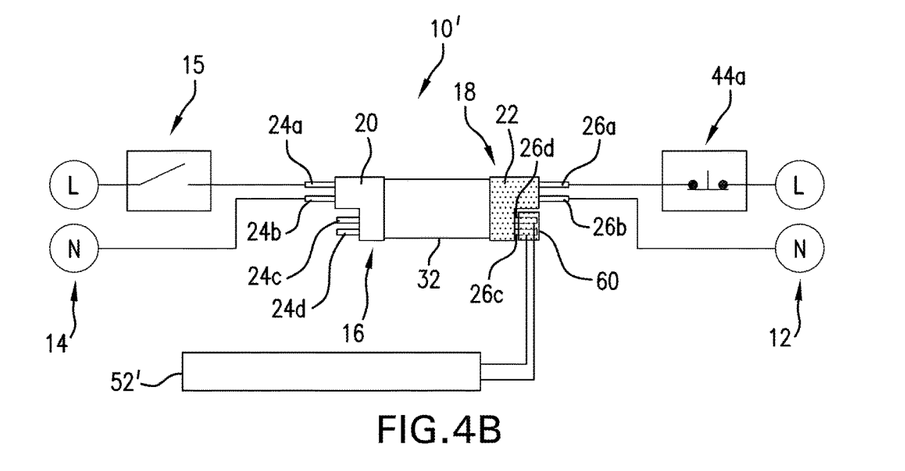

It is noted that during the normal mode, power is selectively supplied from an AC mains 14 to a wall switch 15 (see FIG. 4). Then, if the wall switch 15 is set to on (i.e., closed circuit), power is eventually supplied to the lamp 10, 10'. In contrast, power is not supplied from the AC mains 14 to the lamp 10, 10' during the emergency mode. It will be appreciated that the references to AC mains throughout could instead be DC mains or other forms of mains power without departing from the scope of this disclosure. For example, the AC mains 14 could be referred to as a switched electrical mains.

During either the normal mode or the emergency mode, the lamp 10, 10' outputs light sufficient to comply with regulatory requirements for lighting. In most situations, the power supplied from the AC mains 14 passes through the wall switch 15 (i.e., is a switched mains). However, it is envisioned that there may be limited situations where the AC mains is not switched (i.e., electrical power is always supplied to the lamp 10, 10' without input from an end user). These limited situations may include some schools, offices, and hospitals to prevent deep darkness that could result in a dangerous environment.

The lamp 10, 10' can be a TLED (tubular light emitting diode) lamp and may be of any number of lengths, without departing from the scope of this disclosure. For example, the lamp 10, 10' could be two foot, four feet, or six foot in length. These lengths ensure compatibility during retrofit operations in which existing linear fluorescent lamps are replaced with the present lamp 10, 10'.

With reference to FIGS. 1-2 and 4A-4B, the lamp 10 may include a first end 16 and a second end 18 that are at opposite ends of the lamp 10. A first base 20 can be disposed at the first end 16 and a second base 22 can be disposed at the second end 18. The first base 20 and the second base 22 can be compatible with conventional installations that accept G-13 medium bi-pin bases. It is noted that the first base 20 and the second base 22 could be replaced with any number of bases without departing from the scope of this disclosure. For example, the bases 20, 22 could be traditional G-13 medium bi-pin bases. As will be appreciated that if the second base 22 were replaced with a traditional G-13 medium bi-pin base, an alternate battery connect/disconnect type device would be utilized. Alternatively, the bases 20, 22 could be combined into a single component (i.e., a single base).

The lamp 10, 10' can include a first pair of primary electrical contacts 24a, 24b and a second pair of primary electrical contacts 26a, 26b. The first pair of primary electrical contacts 24a, 24b may be associated with the first base 20 and the second pair of primary electrical contacts 26a, 26b may be associated with the second base 22. The first pair of primary electrical contacts 24a, 24b may be a first pair of line pins 24a, 24b and the second pair of primary electrical contacts 26a, 26b may be a second pair of line pins 26a, 26b.

Notably, the term primary electrical contacts can be used interchangeably with the term line pins without departing from the scope of the disclosure. As will be appreciated, the pins 24a, 24b, 26a, 26b are electrically conductive. However, as will be described in more detail hereinafter, the first pair of line pins 24a, 24b are electrically isolated from the second pair of line pins 26a, 26b. Further, one of the first pair of line pins 24a is spaced from the other of the first pair of line pins 24b and pins 24a, 24b are generally parallel to one another. Further still, one of the second pair of line pins 26a is spaced from the other of the second pair of line pins 26b and the pins 26a, 26b are generally parallel to one another.

The first base 20 can also include a first base face 20a that faces away from the second base 22 and the second base may include a second base face 22a that faces opposite the first base face 20a. As illustrated in the figures, the first pair of line pins 24a, 24b extend from the first base face 20a in a direction away from the second base 22. Further, the second pair of line pins 26a, 26b can extend from the second base face 22a in a direction away from the first base 20.

In addition to the illustrated pins 24a, 24b, 26a, 26b, the lamp 10, 10' can include a pair of first auxiliary contacts 24c, 24d. The first auxiliary contacts 24c, 24d can be disposed on, or associated with, the first base 20. The lamp 10, 10' can also include a pair of second auxiliary contacts 26c, 26d. The second auxiliary contacts 26c, 26d can be disposed on, or associated with the second base 22.

It will also be appreciated that these auxiliary contacts 24c, 24d, 26c, 26d could be used for a variety of functions, including for example, dimming control or with the connection/disconnection of a battery pack 52, 52'. Notably, the battery pack 52 may be located within the lamp 10, as shown in FIG. 4A or the battery pack 52' may be external to the lamp 10', as shown in FIG. 4B. As illustrated, the auxiliary contacts 24c, 24d, 26c, 26d are shown as pins. However, it will be appreciated that the auxiliary contacts 24c, 24d, 26c, 26d could be in many different formats including, for example, recessed or flush. For example, these auxiliary contacts 24c, 24d, 26c, 26d could protrude from the respective bases 20, 22, be recessed within the bases 20, 22, or structured as sockets.

However, the auxiliary contacts 24c, 24d, 26c, 26d do not extend from the bases 24, 26 a sufficient distance so as to interfere with installation of the lamp 10, 10' into a pair of traditional sockets. Further, the battery pack 52, 52' as will be described in more detail hereinafter, may connect with these auxiliary contacts 26c, 26d. In particular, a battery-connect element 60 can be interfaced with the auxiliary contacts to make electrical connection between the auxiliary contacts and providing connection between the battery pack 52, 52' to a battery charge controller 54, as will be described in more detail hereinafter.

The first base 20 may be of a first color and the second base 22 may be of a second color, where the first color is different from the second color. For example, the second base 22 may be red in color, while the first base 20 could be white in color. This differentiation in color could aid in installation of the lamp 10, 10' to ensure that the lamp 10, 10' is oriented such that the first base 20 is electrically connected with and mechanically associated with the AC mains 14 and the second base 22 is electrically connected with and mechanically associated with the emergency mains 12.

With reference to FIGS. 2-4B, the first pair of primary electrical contacts 24a, 24b are for electrical connection with AC mains contacts 28 and the second pair of primary electrical contacts 26a, 26b are for electrical connection with emergency mains contacts 30. As will be appreciated, the emergency mains contacts 30 are in electrical communication with the emergency mains 12 and the AC mains contacts 28 are in electrical communication with the AC mains 14.

As illustrated, the emergency mains contacts 30 and the AC mains contacts 28 are shown as a first lampholder and a second lampholder, respectively. Thus, the first base 20 and the second base 22 can connect or interface with the contacts 28, 30, respectively. It will be understood that the terms emergency mains contacts and first lampholder may be used interchangeably without departing from the scope of the disclosure. Also, the terms AC mains contacts and second lampholder may also be used interchangeably.

It will also be appreciated that the emergency mains contacts 30 and the AC mains contacts 28 could be incorporated into a single component or one general location without departing from the scope of the disclosure. It is envisioned that the first lampholder and second lampholder could be different colors from one another. It is also envisioned that the first lampholder and second lampholder could be of the first color and the second color, respectively, so as to match the color selection of the first base 20 and the second base 22 to aid in proper installation of the lamp 10, 10'.

The first base 20 and the second base 22 can be disposed at opposite ends of the lamp 10, 10' and may be identical in shape. The AC mains contacts 28 can be electrically connected to the AC mains 14 through the wall switch 15 and the emergency mains contacts 30 are electrically connected to the emergency mains 12. As noted hereinbefore, an alternative system environment could be one in which the AC mains 14 does not travel through a switch.

The emergency mains 12 is a non-switched circuit, but associated with the AC mains 14. Notably, a non-switch related outage of the AC mains 14 would also result in an outage of the emergency mains 12. As will be appreciated, the first base 20 and the second base 22 are designed to interface with non-shunted lampholders. Because of the shape and locations of the first base 20 and the second base 22, compatibility with the traditional lampholders already commonly utilized is ensured.

By arranging the first base 20 and the second base 22 such that they receive electrical power from a switched mains (i.e., AC mains 14) and a non-switched mains (i.e., emergency mains 12), respectively, the emergency function of the lamp 10, 10' may be periodically tested to meet UL 924. For reference, UL 924 is entitled "Standard for Emergency Lighting and Power Equipment." As will be appreciated, UL approval may be required for many commercial installations and a UL approved product can provide commercial viability. Further, this capability, and hence regulatory approval, is lacking with the traditional tubular LED lamps.

A housing 32 can extend between the first base 20 and the second base 22. The housing 32 may include a frame 34 and a lens 36 that cooperate to define a housing cavity 38. The frame 34 can have a U-shaped cross-section. It is envisioned that the frame 34 could be made of any number of materials that would be of sufficient strength and rigidity to minimize deformation of the lamp 10, 10', including for example, aluminum. Further, the frame 34 may be made of heat resistant materials. As illustrated, the frame 34 is not transparent or translucent, thereby preventing light being emitted from the lamp 10 from passing therethrough. As such, light from the lamp 10, 10' can more efficiently be directed to the desired locations.

The lens 36 could also be from a plurality of materials, including for example, plastic, and more specifically, polycarbonate. The lens 36 allows light to pass from within the housing cavity 38 to outside of the housing 32. The lens 36 may be transparent, thereby allowing the light to escape the housing cavity 38. Alternatively, the lens 36 may be translucent without departing from the scope of this disclosure. It is also possible that the lens 36 could be omitted from the lamp 10, 10'.

An LED (Light Emitting Diode) array 40 can be disposed on a mounting board 42 within the housing cavity 38. The mounting board 42 can include an upper face 42a and a lower face 42b. The upper face 42a faces toward the lens 36 and the lower face 42b faces in a direction that is opposite the direction that the upper face 42a faces. The upper face 42a receives the LED array 40 and the lower face 42b directly contacts the frame 34. This compact assembly of the frame 34, the LED array 40, and the mounting board 42 allows the lamp 10 to have a reduced diameter to allow for installation in a variety of new and retrofit installations.

As will be appreciated, the array 40 can include a plurality of LEDs. The LED array 40 may be disposed so as to extend in a single column format between the bases 20, 22. Placement of the LED array 40 in such a format between the bases 20, 22 ensures compatibility with existing installations. For example, because the LED array 40 is disposed as described, the reflectors in existing light fixtures will be oriented so as to properly direct light from the lamp 10, 10'.

It will also be appreciated that the LED array 40 will have a sufficient number of LEDs to provide for general purpose illumination. For example, it is envisioned that the LED array 40 could provide at least 900 lumens, and even greater values, for example 1800 lumens. These light output values would be attainable when the lamp 10, 10' is being operated in the normal mode or the emergency mode.

Figure 1:
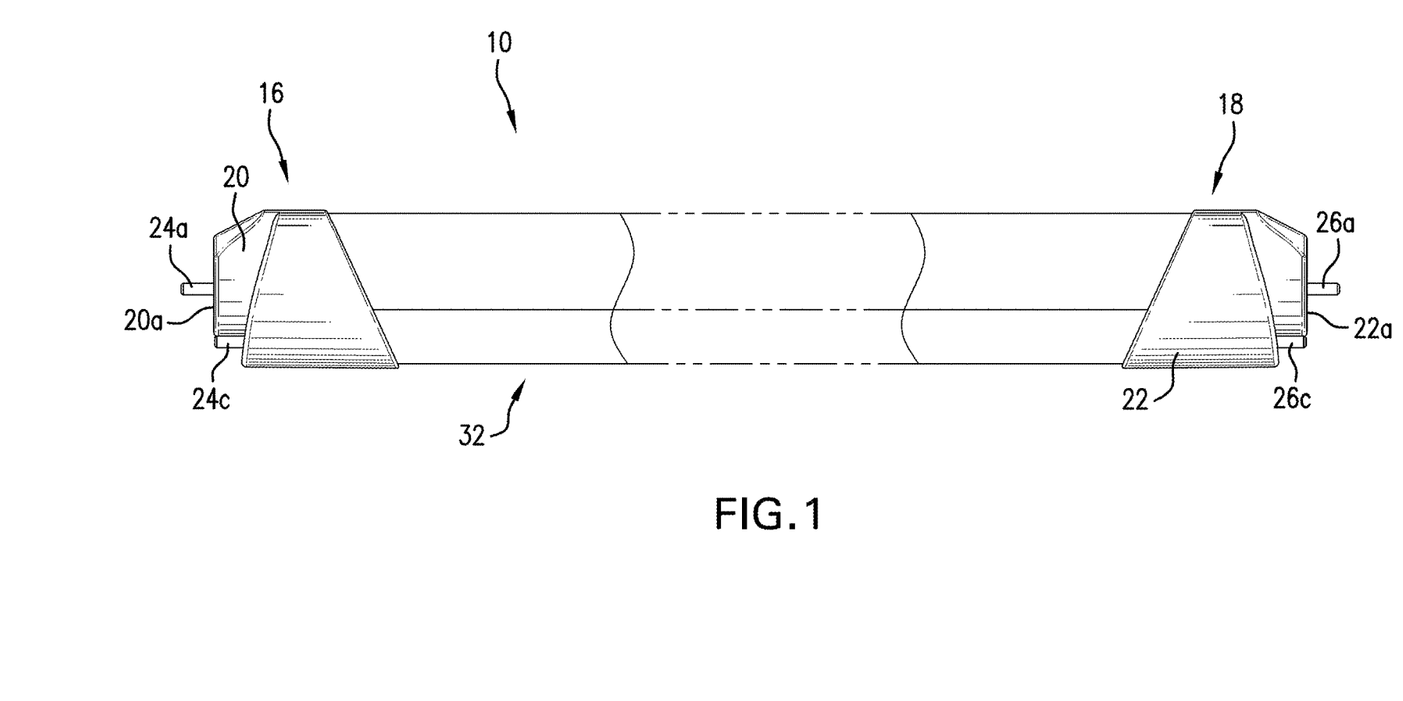
FIG. 1 is a front elevation view of a lamp.
Figure 2:
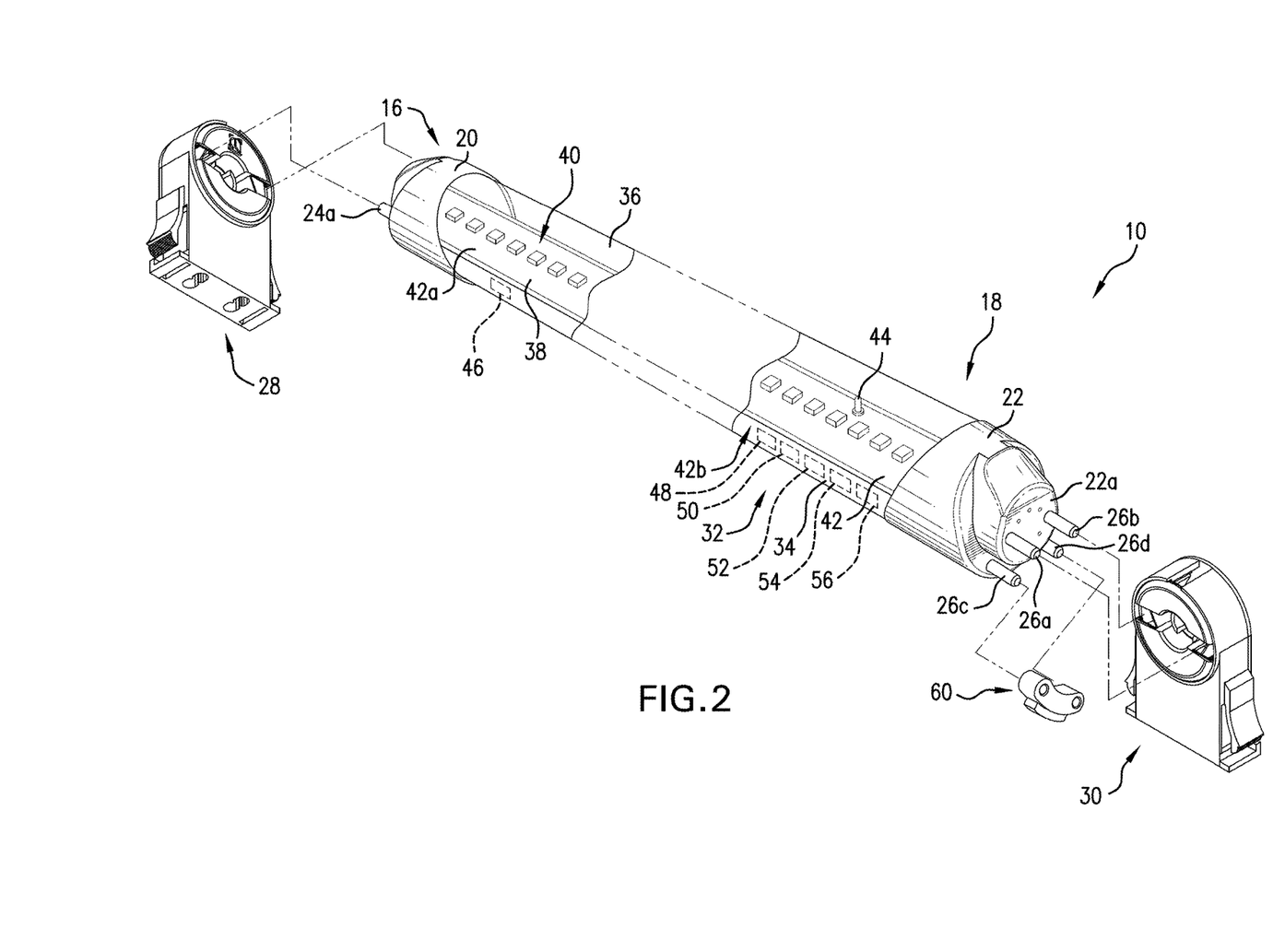
FIG. 2 is a perspective view of the lamp.

With attention to FIG. 2, an indicator light 44 is shown. The indicator light 44 may be located on the mounting board 42 to provide a visual indicator of the status of the lamp 10. For example, the indicator light 44 could indicate a strength, charging condition, and/or fault(s) of the battery pack 52, 52' or a quality of the electricity that is being supplied by the mains 12, 14. The placement of the indicator light 44 on the mounting board 42 allows for the lens 36 to protect the indicator light 44 from damage.

Figure 3:
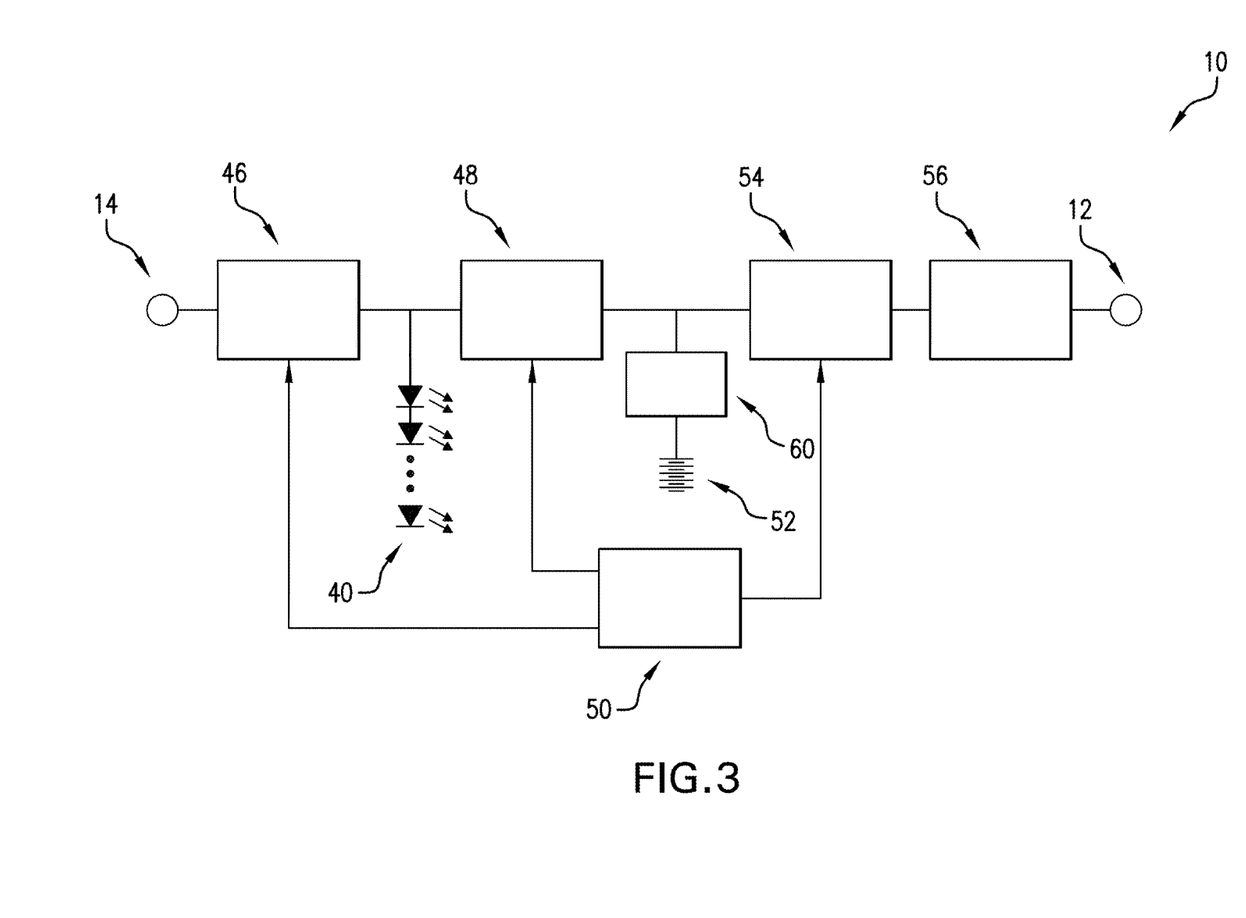
FIG. 3 is an electrical schematic of the lamp.

With reference to FIG. 3, the lamp 10 can also include an AC mains driver 46, an emergency driver 48, a microcontroller 50, the battery pack 52, a battery charge controller 54, and an offline power and isolation module 56. All of these components can be disposed within the lamp 10, and particularly, within the housing cavity 38 of the housing 32. As will be appreciated, these components 46, 48, 50, 52, 54, 56 could be incorporated into a single component or a plurality of components without departing from the scope of this disclosure. It will also be appreciated that while the components are illustrated as being connected to one another with lines, and presumably, electric wires, alternative methods of connection, including for example wireless connection, are contemplated and possible.

The AC mains driver 46 is electrically connected to the AC mains 14 through the AC mains contacts 28. As noted hereinbefore, the AC mains 14 may be switched. The AC mains driver 46 is also electrically connected to the LED array 40. As such, the LED array 40 of the lamp 10, 10' will output light in the normal mode when the wall switch 15 is in the on position (i.e., closed circuit) and the AC mains 14 is supplying electrical power through the AC mains contacts 28 to the first pair of primary pins 24a, 24b and the emergency mains 12 is supplying electrical power through the emergency mains contacts 30 to the second pair of primary pins 26a, 26b.

Further, the LED array 40 of the lamp 10, 10' will not output light when the wall switch 15 is in the off position (i.e., open circuit) and when the emergency mains 12 is supplying electrical power through the emergency mains contacts 30 to the second pair of primary pins 26a, 26b. Finally, the LED of the lamp 10, 10' will output light in the emergency mode when the emergency mains 12 does not supply electrical power to the emergency mains contacts 30, and hence the second pair of primary pins 26a, 26b, regardless of the presence or absence of the AC mains 14 at the first pair of primary pins 24a, 24b. That is to say, the lamp 10, 10' will enter emergency mode when the emergency mains 12 does not supply electrical power regardless of the position of the wall switch 15.

The AC mains driver 46 converts the AC voltage from the AC mains 14 to DC voltage which is suitable for operating the LED array 40. In the normal mode, the AC mains driver 46 receives a form of mains power, which for example could be 100-277 V AC (50/60 Hz), from the AC mains 14 and converts it to a lower DC voltage which is supplied to the LED array 40. This results in the LED array 40 emitting light which can subsequently be discharged through the lens 36.

The emergency mains 12 also supplies a form of unswitched mains power, which for example could be 100-277 V AC (50/60 Hz), during the normal mode. Further, the emergency mains 12 and the AC mains 14 may be of the same or different phases. While it is typical that a power outage event is characterized by a loss of AC mains 14 and simultaneously a loss of emergency mains 12, it will be appreciated that an electrical fault or a test condition may cause the loss of only the AC mains 14 or the emergency mains 12. In such a condition, the loss of emergency mains 12 will always take priority and the lamp 10, 10' will enter emergency mode.

As will be appreciated, the emergency mains 12 is not switched. Thus, the emergency mains 12 supplies power to the battery charge controller 54 and the offline power and isolation module 56 independent of position (i.e., on—closed circuit, off—open circuit) of the wall switch 15. Thus, the battery charge controller 54 can supply electrical power to the battery pack 52, 52' at all times that emergency mains 12 is present, even though the wall switch is 15 may be off and the lamp 10, 10' may not be emitting light. As is considered apparent, the battery charge controller 54 is in electrical communication with the second pair of primary electrical contacts 26a, 26b. The only time when power would not be supplied to the offline power and isolation module 56 from the emergency mains 12 would be when there is a power outage of the circuit at the facility in which the lamp 10, 10' is installed.

The emergency driver 48 supplies DC voltage from the battery pack 52, 52' to the LED array 40 when the lamp 10, 10' is in the emergency mode, thereby causing the LED array 40 to emit light. Thus, the emergency driver 48 is electrically connected to the battery pack 52, 52' and the LED array 40. As such, battery pack 52, 52' selectively supplies electrical power to the LED array 40 to cause the LED array 40 to emit light.

The battery pack 52, 52' can be of NiMH construction and can contain sufficient electrical energy to power the LED array 40, through the emergency driver 48, for a period of at least 90 minutes to comply with various regulatory requirements. As will be appreciated, other rechargeable battery types, different than NiMH, for example, lithium-ion, are possible and contemplated.

The battery charge controller 54 is in electrical communication with the emergency driver 48, and hence, through the second pair of primary electrical contacts 26a, 26b, the emergency mains 12. Further, the battery charge controller 54 is in electrical communication with the battery pack 52, 52' to selectively charge the battery pack 52, 52' during the normal mode. This is accomplished by the battery charge controller 54 supplying DC voltage to the battery pack 52, 52'. As will be appreciated, the battery charge controller 54 does not supply electrical energy to the battery pack 52, 52' during the emergency mode.

As shown in FIG. 3, the microcontroller 50 is in electrical communication with the AC mains driver 46, the emergency driver 48, and the battery charge controller 54. Any and/or all of the following components: the AC mains driver 46, the emergency driver 48, the microcontroller 50, the battery pack 52, the battery charge controller 54, and the offline power and isolation module 56 may be located within the housing cavity 38. As will be appreciated, locating these components within the housing cavity 38 offers numerous advantages. For example, retrofitting existing fixtures that previously housed linear fluorescent lamps with the TLED lamp 10, 10' is greatly simplified. This can be especially apparent with installations involving TLED linear lamps with a length of approximately four feet or longer.

As will be appreciated, the battery pack 52 may be large and require a substantial amount of space within the lamp 10, 10'. For example, a four foot or longer lamp can incorporate the battery pack 52 within the housing cavity 38, as shown in FIG. 4A. However, the battery pack 52' could be located outside of the housing cavity 38, as shown in FIG. 4B. For example, a TLED linear lamp with a length of approximately four feet or less may have the battery pack be outside of the housing cavity due to space constraints. The battery pack 52' may be located outside of the housing cavity 38 to accommodate a battery pack with sufficient electrical capacity to power the LED array for an extended period of time or at a greater brightness.

The microcontroller 50 senses the presence and absence of power being supplied from the emergency mains 12 through the emergency mains contacts 30 to the second pair of primary electrical contacts 26a, 26b. Notably, an electrical connection between the microcontroller 50 and the battery charge controller 54 allows a presence and an absence of electrical power from the emergency mains contacts 30 to be sensed by the microcontroller 50. Thus, when the microcontroller 50 senses that power is being supplied to the emergency mains contacts 30 (i.e., the normal mode), operation of the lamp 10, 10' (i.e., whether the LED array 40 emits light) is dictated by position of the wall switch 15.

As such, during the normal mode, when the wall switch 15 is in the on position, the LED array 40 is powered by AC mains driver 46, thereby resulting in a discharge of light from the LED array 40. Whereas, also during the normal mode, when the wall switch 15 is in the off position, the LED array 40 is not powered and light is not discharged from the LED array 40.

Alternatively, when the microcontroller 50 senses that power is not being supplied to the emergency mains contacts 30 (i.e., the emergency mode), the lamp 10, 10' is powered by the battery pack 52, 52'. More particularly, the battery pack 52, 52' provides electrical power to the emergency driver 48 and the emergency driver 48 outputs electrical power to the LED array 40, resulting in the LED array 40 emitting light.

Notably, operation of the lamp 10, 10' in the emergency mode is independent of the position of the wall switch 15. Stated plainly, the LED array 40 of the lamp 10, 10' will be lit even if the wall switch 15 is in the off position during the emergency mode. This ensures that building occupants are supplied sufficient light for egress should there be a power failure, even if the wall switch 15 was previously in the off position.

The microcontroller 50 also allows tailoring of the operation of the lamp 10, 10' to specific situations, regulations, and model disparities as well as providing smart control of the lamp 10, 10'. For example, the microcontroller 50 can be programmed to charge the battery pack 52, 52' at a predetermined rate according to the capacity of the battery pack 52, 52'. Further, the microcontroller 50 can monitor voltage of the battery pack 52, 52' to avoid over-charging of the battery pack 52, 52' by ceasing charging operation.

The microcontroller 50 can also monitor the voltage of the battery pack 52, 52' to prevent over-discharging of the battery pack 52, 52' by ceasing the lighting function (i.e., stop the supply of electrical energy from the battery pack 52, 52' to the emergency driver 48, thereby causing the lamp 10, 10' to not emit light) once the battery pack 52, 52' is depleted. The microcontroller 50 can also monitor voltage, current, and/or temperature of the battery pack 52, 52' to adjust the 'fully-charged' voltage level to avoid damage to the battery pack 52, 52'.

As will be appreciated, actual measurement of the voltage, current, and/or temperature of the battery pack 52, 52' could be accomplished by a variety of devices and methods known to those of ordinary skill in the art. The microcontroller 50 can also disable the AC mains driver 46 while in emergency mode. Further still, the microcontroller 50 can drive the emergency lighting function or modify the power output and therefore brightness of LED array 40 to conserve battery power.

The offline power and isolation module 56 is electrically connected to the second pair of primary electrical contacts 26a, 26b so as to electrically isolate the first pair of primary electrical contacts 24a, 24b from the second pair of primary electrical contacts 26a, 26b. This ensures that no shock hazard exists should one end be electrically charged while the other end is touched by a person. For example, if the lamp 10, 10' was partially installed into a fixture such that the first pair of primary electrical contacts 24a, 24b of the lamp 10, 10' received power from the AC mains 14 through the AC mains contacts 28, but the individual installing the lamp 10, 10' touched the second pair of primary electrical contacts 26a, 26b, the installer would not be shocked. Electrical isolation between the first pair of pins 24a, 24b and second pair of pins 26a, 26b allows for the AC mains 14 and the emergency mains 12 to be of different electrical phases without creating an electrical conflict.

Thus, in the normal mode, as determined by the microcontroller 50, power is supplied from the AC mains 14 through the AC mains contacts 28. This AC electrical energy is then converted by the AC mains driver 46 into a lower DC voltage and used to power the LED array 40, thereby resulting in the LED array 40 discharging light from the housing cavity 38. Simultaneously, in the normal mode, power is also supplied by the emergency mains 12 through the emergency mains contacts 30.

The microcontroller 50 instructs the battery charge controller 54 to charge the battery pack 52, 52', if deemed necessary. The microcontroller 50 may make the determination of whether the battery pack 52, 52' needs charged by evaluating a number of variables relating to the battery pack 52, 52', including for example, voltage of the battery pack 52, 52' with and without a load being applied. However, as will be appreciated, power from the battery pack 52, 52' is not used to power the LED array 40 during the normal mode. As such, the battery pack 52, 52' of the TLED lamp 10, 10' is charged based upon instructions sent from the microcontroller 50 to the battery charge controller 54 located within the TLED lamp 10, 10'. In particular, the microcontroller 50 may instruct the battery charge controller 54 to charge the battery pack 52, 52' at any time that the emergency mains 12 is present.

As illustrated in FIGS. 4A-4B, a normally closed test button 44a is located so as to be remote from the lamp 10, 10'. The test button 44a defines a normal operation position in which the test button 44a is not depressed and the emergency mains 12 is supplying electricity to the lamp 10, 10' through the second pair of primary pins 26a, 26b. The test button 44a also defines a test position in which the test button 44a is depressed and the supply of electricity from the emergency mains 12 to the second pair of primary pins 26a, 26b is interrupted. When the test button 44a is in the test position, the microcontroller 50 permits only the emergency driver 48 to supply the power to the LED array 40.

By depressing the test button 44a, an open circuit between the emergency mains 12 and the microcontroller 50 is created. As such, the lamp 10, 10' is operated as though in the emergency mode. Thus, the lamp 10, 10' is then solely powered by the battery pack 52, 52' as described hereinbefore. It is also noted that, independent of the position of the wall switch 15, the LED array 40 of the lamp 10, 10' will enter emergency mode when the test button 44a is depressed. By locating the test button 44a remote from the lamp 10, 10', there is no risk of if the lamp 10, 10' were changed with a dissimilar lamp that the "test" feature for the system is lost. Further, this remote placement of the test button 44a allows for easy access to the test button 44a for routine testing of the lamp 10, 10'.

With reference to FIGS. 4A-4B, the lamp 10, 10' may be supplied with a battery-connect element 60. The battery-connect element 60 may be removably received on the second pair of auxiliary contacts 26c, 26d so as to electrically connect the battery pack 52, 52' to the emergency driver 48. The battery-connect element 60 includes a core that is an electrical conductor and an exterior that is of an electrical insulator (i.e., made of an electrical insulative material). The core allows for electrical connection between the pins 26c, 26d, and hence, electrical connection of the battery pack 52, 52' to the other components of the lamp 10, 10'.

The battery-connect element 60 can be a removable item that can be supplied with the lamp 10, 10' prior to installation, but is not directly connected to the lamp 10, 10', prior to installation of the lamp 10, 10'. Notably, by not installing the battery-connect element 60 until the lamp 10, 10' is ready for installation, the lamp 10, 10' does not attempt to operate with power from the battery pack 52, 52'. This ensures that the battery pack 52, 52' is not unnecessarily used prior to installation of the lamp 10, 10'. Subsequent to initial installation, and prior to usage of the lamp 10, 10', the battery-connect element 60 is applied to the pins 26c, 26d by the individual that is installing the lamp 10, 10'.

In particular, the battery-connect element 60 is placed on the lamp 10, 10' such that there is continuity between the pins 26c, 26d of the second base 22 to electrically connect the battery pack 52 with the rest of the lamp 10, 10'. By locating the pins 26c, 26d, and hence the battery-connect element 60 on the second base 22, the size of the battery-connect element 60 can be of a small size. Comparison between FIGS. 4A and 4B reveals that the battery pack 52 is located within the lamp 10 in FIG. 4A, whereas the battery pack 52' illustrated in FIG. 4B is disposed outside of the lamp 10'.

The battery-connect element 60 can be in multiple different forms without departing from the scope of the disclosure. For example, the battery-connect element 60 may be integrated into the lamp 10, 10' as a switch. Alternatively, the battery-connect element 60 may be an insulating material that, when installed in the lamp 10, 10', interrupts electrical contact between the battery pack 52, 52' and the battery charge controller 54 and the emergency driver 48. However, when removed, electrical contact is enabled.

Thus, the only non-dimensional difference between the lamp 10 of FIG. 4A and the lamp 10' of FIG. 4B, is that the battery pack 52 of the lamp 10 is located within the lamp 10 and the battery pack 52' of the lamp 10' is located exterior of the lamp 10'. As such, there are no other differences between the lamps 10, 10' of FIGS. 4A and 4B. Typically, FIG. 4A illustrates a lamp that is approximately four feet in length, whereas FIG. 4B shows a lamp that is approximately two feet in length.

Figure 5:
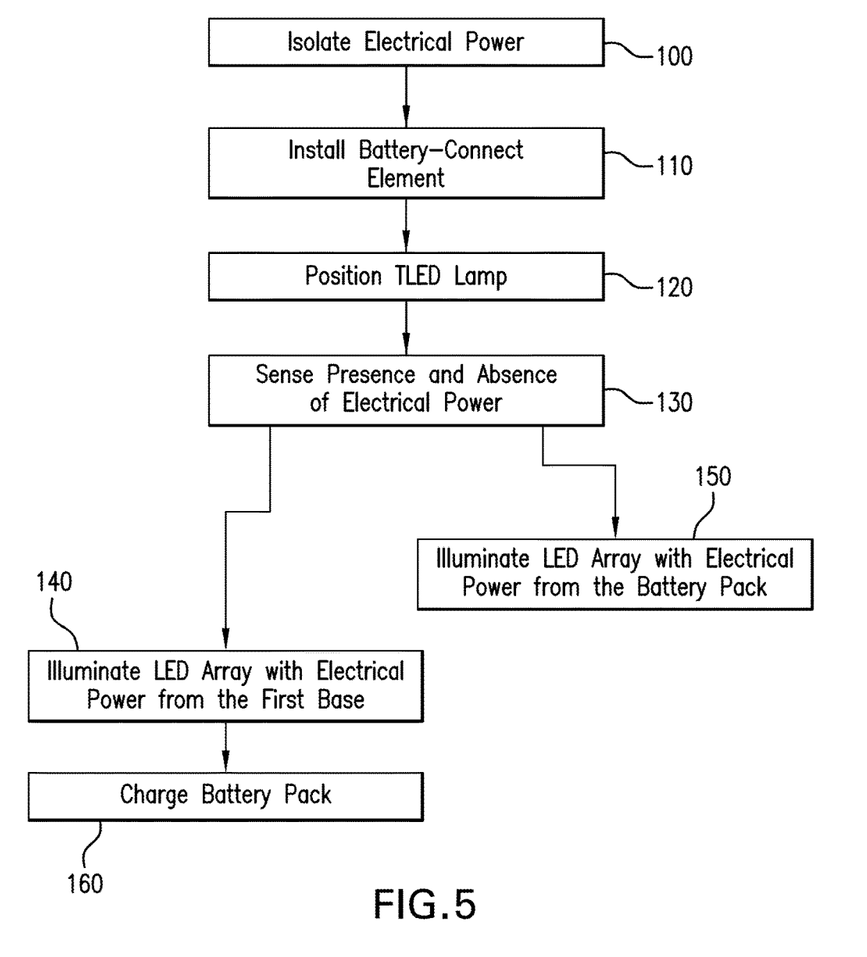
FIG. 5 is a flowchart illustrating a method of operating a TLED lamp.

With reference to FIG. 5, a method of operating a TLED lamp is shown. At 100, any electrical power supplied to the first base 20 is isolated from the second base 22. This isolation continues occurring any time that electrical power is supplied to the first base 20. At 110, the battery-connect element 60 is installed on the TLED lamp 10, 10' to electrically connect the battery pack 52, 52' to the LED array 40. At 120, the TLED lamp 10, 10' is positioned such that the first base 20 of the TLED lamp 10, 10' is electrically and mechanically connected to the AC mains contacts 28 and the second base 22 of the TLED lamp 10, 10' is electrically and mechanically connected to the emergency mains contacts 30. For reference, the AC mains contacts 28 are electrically connected to a first electrical circuit, that may be switched, and the emergency mains contacts 30 are electrically connected to a second electrical circuit that is not switched.

At 130, a presence and an absence of electrical power supplied to the second base 22 is sensed. At 140, the LED array 40 of the TLED lamp 10, 10' illuminates due to electrical power supplied to the first base 20 when the presence of the electrical power at the second base 22 is sensed. Alternatively, at 150, the LED array 40 of the TLED lamp 10, 10' illuminates due to electrical power from the battery pack 52 when the absence of the electrical power at the second base 22 is sensed. At 160, the battery pack 52, 52' of the TLED lamp 10, 10' is charged with the electrical power supplied to the second base 22.

As will be appreciated, because of the similar construction of the first base 20 and the second base 22, the lamp 10, 10' to be incorrectly installed in the lampholders 28, 30 (e.g., backwards). For example, the lamp 10, 10' could be installed such that the first base 20 would incorrectly be in electrical communication to with the AC mains contacts 28, while the second base 22 would incorrectly be in electrical communication with the emergency mains contacts 30. To prevent this scenario, an indicia is provided to differentiate between the first base and the second base. For example, the first base 20 may be a neutral color, such as white, while the second base 22 could be a different color, such as red. Further, labelling may be used to indicate or differentiate the first base 20 from the second base 22.

When the lamp 10, 10' is incorrectly installed, the lamp 10, 10' will enter emergency mode when the wall switch 15 is in the off position, rather than turning off, so as to notify the installer of the error. Further, pressing the test button 44a will cause the LED array 40 to turn off if the wall switch 15 is on, or stay in emergency mode if the wall switch 15 is off. These atypical responses help ensure proper installation, and provide easy identification of improper installation to the installer or nearby observer. Further, the first lampholder 28 can be such that it mechanically prohibits receipt of the second base 22 with the battery-connect element 60 installed from achieving electrical communication.

As will also be appreciated, this method offers numerous advantages. For example, the TLED lamp 10, 10' can be used in retrofit installations and easily provide emergency lighting whenever there is a failure of the main power system. Further, operation and installation of the TLED lamp 10, 10' is simplified due to the similar construction to traditional linear fluorescent lamps.

A lamp with battery backup capability has been described above with particularity. Modifications and alterations will occur to those upon reading and understanding the preceding detailed description. The invention, however, is not limited to only the embodiments described above. Instead, the invention is broadly defined by the appended claims and the equivalents thereof. Moreover, it will be appreciated that variations of the above-disclosed components and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lamp, comprising:
a first pair of primary electrical contacts configured to be electrically connected to a AC mains;
a second pair of primary electrical contacts configured to be electrically connected to a non-switched emergency mains;
a battery charge controller in electrical communication with the second pair of primary electrical contacts;
a battery pack in electrical communication with the battery charge controller; an AC mains driver electrically connected to the first pair of primary electrical contacts;
an emergency driver electrically connected to the battery pack;
second auxiliary contacts electrically connected to the battery pack;
an LED array in electrical communication with the AC mains driver and the emergency driver; and
a microcontroller that is electrically connected to the AC mains driver, the emergency driver, and the battery charge controller, wherein an electrical connection between the microcontroller and the battery charge controller allows a presence and an absence of electrical power from the second pair of primary electrical contacts to be sensed by the microcontroller, wherein the microcontroller instructs only the AC mains driver to supply electrical power to the LED array when power is present at the second pair of primary electrical contacts and instructs only the emergency driver to supply power to the LED array when power is absent from the second pair of primary electrical contacts, wherein one of the primary electrical contacts of the second pair of primary electrical contacts is configured to be electrically connectable to a normally closed test button, the test button defining a normal operation position in which the test button is not depressed and the emergency mains is supplying the electrical power to the lamp through the second pair of primary electrical contacts and a test position in which the test button is depressed and the supply of the electrical power from the emergency mains to the second pair of primary electrical contacts is interrupted, and wherein when the test button is in the test position the microcontroller permits only the emergency driver to supply the electrical power to the LED array.

2. The lamp of claim 1, further comprising:
a first base associated with the first pair of primary electrical contacts and configured to be mechanically connected to a first lampholder, wherein the first lampholder is electrically connected to the AC mains; and
a second base associated with the second pair of primary electrical contacts and configured to be mechanically connected to a second lampholder, wherein the second lampholder is electrically connected to the non-switched emergency mains.

3. The lamp of claim 2, further comprising a housing that extends between the first base and the second base, the housing including a frame and a lens that cooperate to define a housing cavity, wherein the emergency driver and the battery pack are located in the housing cavity, and wherein the first base and the second base are disposed at opposite ends of the lamp such that the LED array is disposed between the first base and the second base.

4. The lamp of claim 2, further comprising a battery-connect element that electrically connects the battery pack to the emergency driver.

5. The lamp of claim 3, wherein the lens is configured to permit light from the LED array to pass therethrough and the frame is configured to prevent the light from the LED array from passing therethrough.

6. The lamp of claim 3, wherein the battery charge controller and the AC mains driver are located within the housing cavity.

7. The lamp of claim 3, further comprising:
a mounting board that extends between the first base and the second base, the mounting board including an upper face that faces toward the lens and a lower face that is opposite the upper face, wherein the upper face receives the LED array and the lower face directly contacts the frame.

8. The lamp of claim 1, wherein the AC mains is switched.

9. The lamp of claim 1, wherein the microcontroller controls the battery charge controller to supply electrical power to the battery pack when the presence of electrical power from the second pair of primary electrical contacts is sensed.

10. The lamp of claim 1, wherein the AC mains is not switched.

11. The lamp of claim 2, wherein the first pair of primary electrical contacts are a pair of first line pins and the second pair of primary electrical contacts are a pair of second line pins, and wherein the pair of first line pins are electrically isolated from the pair of second line pins.

12. The lamp of claim 11, the first base including a first base face that faces away from the second base and the second base includes a second base face that faces opposite the first base face, wherein one of the pair of first line pins is spaced from and extends so as to be generally parallel to the other of the first line pins, and wherein the pair of first line pins extends from the first base face in a direction away from the second base and the pair of second line pins extends from the second base face in a direction away from the first base.

13. The lamp of claim 2, wherein the first base and the second base are identical in shape, and wherein an indicia is provided to differentiate between the first base and the second base.

14. The lamp of claim 13, wherein the first base is of a first color and the second base is of a second color, and wherein the first color is different from the second color.

15. The lamp of claim 2, wherein the second auxiliary contacts are associated with the second base, and wherein the second auxiliary contacts do not extend from the second base a sufficient distance so as to interfere with the connection of the lamp with the second lampholder.

16. The lamp of claim 2, further comprising:
first auxiliary contacts associated with the first base, wherein the first auxiliary contacts do not extend from the first base a sufficient distance so as to interfere with the connection of the lamp with the first lampholder.

17. The lamp of claim 16, wherein the second auxiliary contacts do not extend from the second base a sufficient distance so as to interfere with the connection of the lamp with the second lampholder.

* * * * *